US007389309B2

(12) United States Patent
Edelstein et al.

(10) Patent No.: US 7,389,309 B2
(45) Date of Patent: Jun. 17, 2008

(54) METHOD FOR MANAGING FILE REPLICATION IN APPLICATIONS

(75) Inventors: Noah Edelstein, Seattle, WA (US); Hani Saliba, Seattle, WA (US); Hai Liu, Redmond, WA (US); Steven James Rayson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 10/376,738

(22) Filed: Feb. 28, 2003

(65) Prior Publication Data

US 2004/0172425 A1 Sep. 2, 2004

(51) Int. Cl.
G06F 17/30 (2006.01)

(52) U.S. Cl. .................. 707/203; 707/8; 707/10; 707/201; 715/229

(58) Field of Classification Search .............. 707/10, 707/203, 8, 200, 201; 715/229; 717/108, 717/170
See application file for complete search history.

(56) References Cited

U.S. PATENT DOCUMENTS

| | | | | |
|---|---|---|---|---|
| 5,278,979 A | * | 1/1994 | Foster et al. | 707/203 |
| 5,438,661 A | * | 8/1995 | Ogawa | 715/804 |
| 5,694,596 A | * | 12/1997 | Campbell | 707/10 |
| 5,806,078 A | * | 9/1998 | Hug et al. | 715/511 |
| 5,835,911 A | * | 11/1998 | Nakagawa et al. | 707/203 |
| 5,881,292 A | * | 3/1999 | Sigal et al. | 717/170 |
| 5,937,405 A | * | 8/1999 | Campbell | 707/10 |
| 6,041,333 A | | 3/2000 | Bretschneider et al. | 707/203 |
| 6,182,073 B1 | * | 1/2001 | Kukkal | 707/10 |
| 6,256,773 B1 | | 7/2001 | Bowman-Amuah | 717/1 |
| 6,314,565 B1 | * | 11/2001 | Kenner et al. | 717/171 |
| 6,324,544 B1 | | 11/2001 | Alam et al. | 707/201 |
| 6,341,291 B1 | * | 1/2002 | Bentley et al. | 707/203 |
| 6,377,951 B1 | * | 4/2002 | Campbell | 707/10 |
| 6,449,624 B1 | | 9/2002 | Hammack et al. | 707/203 |
| 6,493,732 B2 | * | 12/2002 | Aoyama et al. | 715/511 |
| 6,513,084 B1 | | 1/2003 | Berkowitz et al. | 710/242 |
| 6,529,921 B1 | | 3/2003 | Berkowitz et al. | 707/500.1 |
| 6,532,591 B1 | * | 3/2003 | Arai et al. | 725/132 |
| 6,560,655 B1 | | 5/2003 | Grambihler et al. | 709/248 |
| 6,651,249 B2 | * | 11/2003 | Waldin et al. | 717/170 |
| 6,658,330 B2 | * | 12/2003 | Delaruelle | 701/19 |
| 6,662,209 B2 | * | 12/2003 | Potts et al. | 709/203 |
| 6,804,663 B1 | * | 10/2004 | Delo | 707/3 |
| 6,845,383 B1 | * | 1/2005 | Kraenzel et al. | 707/200 |
| 7,076,778 B2 | * | 7/2006 | Brodersen et al. | 717/170 |
| 7,350,191 B1 | * | 3/2008 | Kompella et al. | 717/108 |
| 2003/0167318 A1 | * | 9/2003 | Robbin et al. | 709/221 |

OTHER PUBLICATIONS

Christoffel, J., "Bal-A Tool to Synchronize Document Collections Between Computers", *LISA XI*, 1997, 85-88.

(Continued)

*Primary Examiner*—Jean M Corrielus
(74) *Attorney, Agent, or Firm*—Woodcock Washburn LLP

(57) ABSTRACT

A method for managing a first and second version of an electronic file is disclosed. In the method, first and second versions of an electronic file are recognized and a synchronization event is initiated. An application program interface accesses the first and second versions, compares information associated with each, generates a result and reports the result to the first software application. A second software application generates a user interface in accordance with a feature of the second software application, where the electronic file is associated with the second software application, and the user interface is displayed on a display device.

21 Claims, 4 Drawing Sheets

OTHER PUBLICATIONS

Osel, P.W. et al., "OpenDist-Incremental Software Distribution", *LISA IX*, 1995, 181-193.

Banzi, M. et al., "An Experience in Configuration Management in Sodalia", *System Configuration Management. 9th International Symposium, SCM-9. Proceedings (Lecture notes in Computer Science)*, 1999, 1675, 66-85.

Gaifullin, B.N. et al., "ClearCase-source Code Managing System", *10th international Crimean Microwave Conference "microwave and Telecommunication Technology" Conference Proceedings (IEEE Cat No. 00 EX415)*, 2000, 90-93.

Haake, A. et al., "Take CoVer:Exploiting Version Support in Cooperative Systems", *Integrated Publication & Inf. Syst. Inst., Gesellschaft fur Math. Und Datenverarbeitung mbH, Darmstadt, Germany*, 1993, 406-413.

Lee, B.G et al., "An integrated Approach to Distributed Version Management and Role-Based Access Control in Computer Supported Collaborative Writing", *Journal of Systems and Software*, 2001, 59(2), 119-134.

Siepmann, E., "A data Management interface as part of the framework of an Integrated VLSI-Design System", *IEEE International Conference on Computer-Aided Design. Digest of Technical Papers*, 1989, 284-287.

Chan, F., "ClearCase—An Overview", Mar. 27, 1996, retrieved from the Internet Feb. 21, 2005, http://www.cad.eecs.berkeley.edu, 6 pages, XP-002318499.

"Developing Software", Rational ClearCase, Version 2002.05.00 and Later, Part No. 800-025057-000, Oct. 2001, Retrieved from the Internet Aug. 21, 2007, ftp://ftp.software.ibm.com, 4 pages, XP-002447500.

"Command Reference (A-L)", Rational ClearCase, Version 2002. 05.00 and Later, Part No. 800-025071-000, Oct. 2001, Retrieved from the Internet Aug. 21, 2007, 3 pages, XP-002447501.

Crnkovic, I. et al., "Complex System Development Requirements-PDM and SCM Integration", *IEEE Comput. Soc.*, 2001, 427-435, XP-010583249.

\* cited by examiner

METHOD FOR MANAGING FILE REPLICATION IN APPLICATIONS

RELATED APPLICATIONS

This patent application relates to commonly assigned U.S. patent application Ser. No. 10/376,873, filed Feb. 28, 2003 under and entitled "Method and System for Managing Multiple File States For Replicated Files."

FIELD OF THE INVENTION

The present invention is directed to methods for managing multiple versions of an electronic file. More particularly, the present invention relates to methods for using relevant application functionality to reconcile versions of a file during a synchronization event.

BACKGROUND OF THE INVENTION

It is common practice in a networked computer environment for a computer user to collaborate on an electronic document with another user on the network. Such a network may be a Local Area Network (LAN), Wide Area Network (WAN), the Internet or the like. In such a collaboration, each user may create and edit an electronic file by using a software application such as general application software, or software designed specifically for the type of file that is the object of the collaboration, or the like.

The collaboration may be made possible by maintaining a master version of the electronic file in a location that is accessible to all users who will be collaborating on the file. In a conventional networked computer environment, there may exist a server computer and one or more user computers. The server maintains communications links between, and is accessible to, each user computer and therefore may store and control the master version of the file being collaborated on by the users. When collaborating on an electronic file, a user may first access the master version of the file on the server, and then copy the file to the user's computer. The user may then work on the file by altering the file in any way made available to the user by the application. For example, if the application is a word processor, spreadsheet, database, and/or the like, the application may provide means for performing tasks such as editing, copying, deleting and/or the like. At the completion of any alterations, the user may save changes to the version of the file stored on the user's computer if the user wishes to retain such alterations to the file. In other systems, such as a system where no server computer exists, the master version may be stored on a user computer.

In order to collaborate with other users via the server, a user with a changed version stored on the user's computer must synchronize the version of the file on the computer with the master version of the file on the server. Synchronizing a plurality of versions of an electronic file, in its simplest form, ensures that all versions, once synchronized, are identical. In this way, the user performing the synchronization will enable other users who are participating in the collaboration to access the newly-altered file. Conventionally, a synchronization is performed by a synchronization utility. A synchronization utility is typically separate from the application, and in many cases is part of the operating system of the user computer. The conventional synchronization utility performs synchronizations at predetermined times, or as requested by the operating system.

In a conventional synchronization, a synchronization utility will compare the user version of the file to the master version of the file using whatever information about the copies the utility is able to comprehend. Typically, such information is limited to the date and/or time of the last update of each version. If the date and/or time is identical, the synchronization utility determines that both versions are identical, and therefore synchronized, and that no further action is required. If a discrepancy exists between the date and/or time, however, the synchronization utility provides the user associated with the computer that is driving the synchronization event with a user interface. The user interface conventionally provides a user with a brief notification that there is a discrepancy, the date and/or time of such last update for each version of the file, and a request for an instruction from the user as to which copy of the file the user wishes to keep. If the user elects to keep the user version, the synchronization utility overwrites the master version with the user version, thereby making the user version the new master version on the server. If the user desires to keep the master version, no further action is taken, or the user version is overwritten with the master version. In some user interfaces, a user is presented with an option to abort the synchronization, rather than choosing which version will be the master version.

The conventional synchronization as discussed above has significant disadvantages. Because a conventional synchronization utility has limited functionality with respect to an electronic file, a user interface generated by the conventional utility presents only a limited amount of information to a user when prompting a user to select a course of action. Such a limited amount of information may therefore cause such user to make an uninformed and possibly incorrect decision about which course of action to take. For example, a first user may alter a previously-synchronized user version of the file and then at some point the conventional synchronization utility initiates a synchronization event. When notified by the conventional user interface, the user may see that the user version was updated later than the master version and therefore decide to overwrite the master version. However, the information presented by the conventional user interface does not inform the user whether the master version has remained unchanged since the user began altering the user version. This leads to a problematic situation, where a second user may have made alterations to another user version, and then synchronized that user version with the master version before the first user's synchronization. The first user's version is more recent—having been updated later—but the master version has undergone alterations by the second user that were not present when the first user originally copied the file from the server. As a result, the second user's alterations to the master version are lost once the first user completes the synchronization.

The above situation is caused by a conventional synchronization utility's lack of the full range of functionality inherent in the application relevant to the file, so the utility is unable to use that functionality during a synchronization event. Therefore, the utility can only provide to a user a very limited amount of information regarding the different versions of the electronic file, such as, for example, the date and/or time of the last update to each version of the file as discussed above.

Another disadvantage caused by the limited functionality of conventional synchronization utilities is the lack of multiple courses of action available to a user during a synchronization. For example, in the example discussed above, the user interface only presents three options: update the master copy with the user copy, update the user copy with the master copy, or abort.

A further disadvantage of a conventional synchronization utility stems from a lack of integration of such utility with such application. For example, and as discussed above, a conventional synchronization utility is part of an operating system of a user or server computer. Therefore, the synchronization process, and any applicable user interface, is conventionally conducted outside of the application user experience. This may lead to confusion among users who—while such users may be proficient with the application—are not proficient with an operating system utility. Additionally, and as a result of the lack of integration, a synchronization may be initiated by the synchronization utility at a time that is not optimal for such event to take place. An additional disadvantage of conventional synchronization utilities is the inability of such a utility to be used as a component of a software application. For example, using conventional methods, a computer programmer is unable to create a first software application that uses a synchronization utility that as the ability to use a second application appropriate to the electronic file to reconcile multiple versions of the electronic file. Therefore, what is needed is an efficient means of using relevant software application functionality to resolve conflicts between copies of a file during a synchronization.

SUMMARY OF THE INVENTION

In view of the foregoing, the present invention provides methods of integrating an application program interface with a software application that allows the application to request and control a file synchronization process while remaining in the application user experience. The invention provides for a method for managing a first and second version of an electronic file. In the method, first and second versions of an electronic file are recognized and a synchronization event is initiated using a first software application operating on a first computer. An application program interface accesses the first and second versions, compares information associated with each, generates a result and reports the result to the first software application. A second software application generates a user interface in accordance with a feature of the second software application, where the electronic file is associated with the second software application, and the user interface is displayed on a display device.

The invention also provides for the second software application to generate a synchronization option and to present the option with the user interface and to display the user interface the display device. The second software application may also receive an option selection and synchronizes the first and second versions of the electronic file accordingly. The invention further provides that the first software application and the second software application may be the same software application. The application may provide any amount of information to the user regarding the first and second versions, and the user may input any number or type of synchronization selections. In one embodiment, the user may create a third version comprising any portion, or none, of either first or second version, or both. The application may initiate the synchronization at any time, such as at the user's request. Additional features and advantages of the invention are set forth in the description below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

The present invention provides methods of integrating an application program interface with a software application that allows the application to request and control a file synchronization process while remaining in the application user experience. The invention provides for a method for managing a first and second version of an electronic file. In the method, first and second versions of an electronic file are recognized and a synchronization event to synchronize the first version on the first computer with the second version is initiated using a first software application operating on a first computer. An application program interface accesses the first and second versions, information associated with each of the first and second versions is compared and a result is generated. The result of the comparison is reported to the first software application. A second software application is caused to generate a user interface in accordance with a feature of the second software application, wherein the electronic file is associated with the second software application, and the user interface is displayed on a display device.

The invention also provides for the second software application to generate a synchronization option and to cause the synchronization option to be presented by the user interface and displayed on the display device. The second software application also receives an option selection and synchronizes the first and second versions of the electronic file according to the option selection. The invention further provides that the first software application and the second software application may be the same software application, and therefore all steps may be performed by a single application.

The application may provide any amount of information to the user regarding the first and second versions, and the user may input any number or type of synchronization selections. In one embodiment, the user may create a third version comprising any portion, or none, of either first or second version, or both. The application may initiate the synchronization at any time, such as at the user's request.

Exemplary Computing Environment

Figure 1:
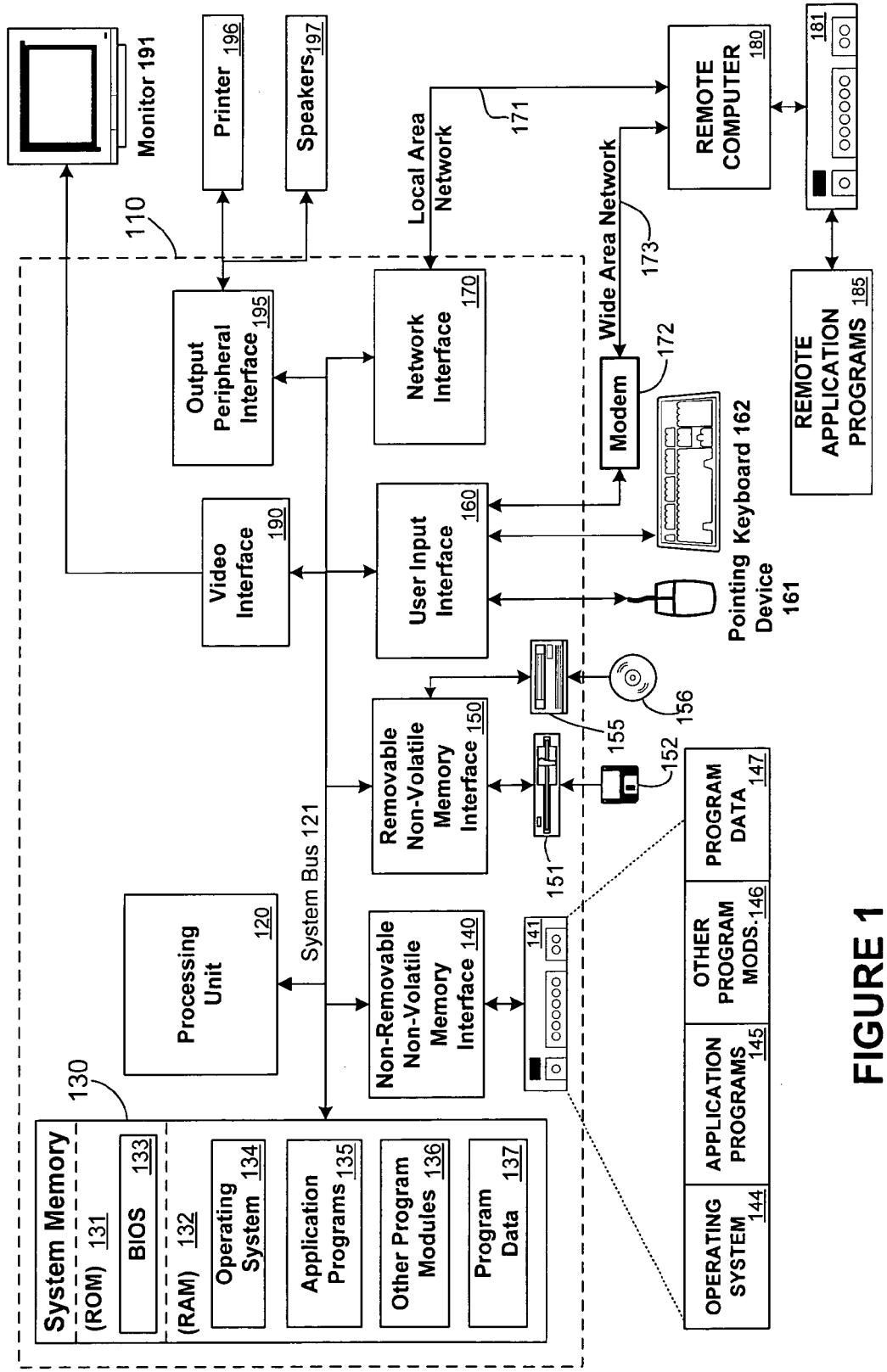
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of NET's languages and services, and in other distributed computing frameworks as well.

Exemplary Embodiments

When an electronic file has been formed into more than one version, according to the invention, an application program interface may be configured to allow a software application associated with the file to control a process of synchronizing the plurality of versions. In one embodiment, the application may initiate the synchronization automatically, while in another embodiment, the application may initiate the synchronization based on user input. In another embodiment, the application presents synchronization options provided by application functionality to the user, and permits the user to select options and perform tasks using the application functionality. In yet another embodiment, a first application initiates the synchronization, while a second application presents synchronization options to a user.

Figure 2:
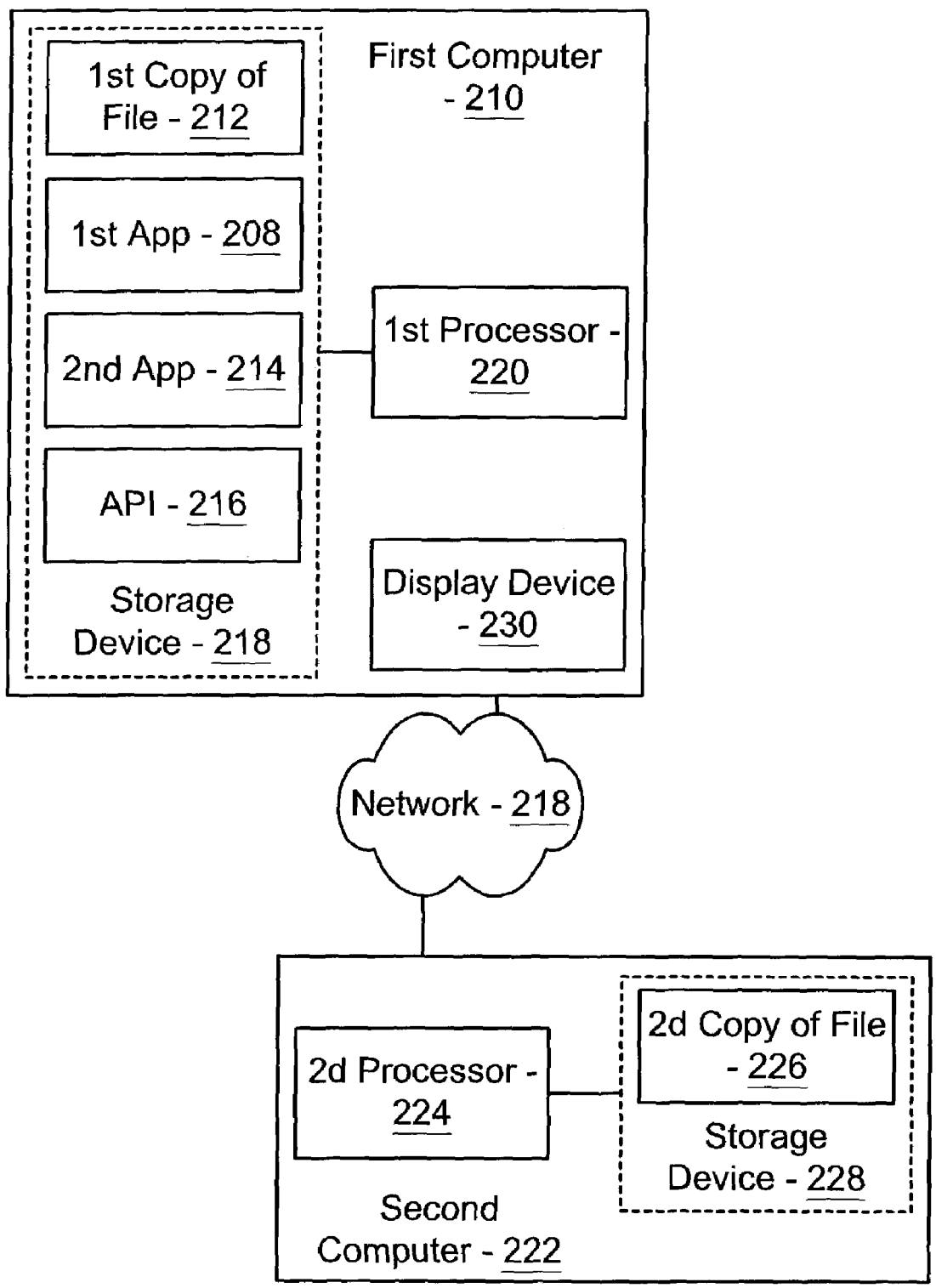
FIG. 2 is a functional diagram illustrating an example of a relationship between a first computer, a network and a second computer.

Referring now to FIG. 2, a first computer 210 comprises a first processor 220 in operative communication with a storage device 218. First computer 210 may be a general purpose desktop or portable computer, a workstation, a specialized computing device and/or the like. Likewise, first processor 220 may be a general purpose computer processor, a specialized processor, a network of processors or the like. Operatively associated with first computer 210 is display device 230. Display device 230 may be any means of presenting options and the like to a user, such as for example a monitor, speakers or the like. Such operative association of display device 230 to first computer 210 may be made by any wired or wireless connective means. While display device 230 is shown to be within first computer 210 in FIG. 2, display device 230 may be located anywhere that is in operative communications with first processor 220, to include a remote location or the like.

Storage device 218 may be a hard drive, CD-ROM, magnetic disk, DVD, RAM and/or the like. Like display device 230, storage device 218 may be located anywhere that is in operative communications with first processor 220. Operative communications in such a situation may be wired, wireless or any combination thereof. Contained within storage device 218 is a first version 212 of an electronic file. Such first version 212 may be any type of electronic file, such as for example a word processing document, spreadsheet, database and/or the like.

First application 208 and second application 214 may be stored in storage device 218. First application 208 and second application 214 may be any type of computer-executable instructions, such as for example a word processor, spreadsheet, database, programmed script, specialized software or the like. In embodiments where both first application 208 and second application 214 are present, as discussed below, only second application 214 need be compatible with the electronic file. Alternatively, and as will also be discussed below, first application 208 and second application 214 may be the same application. One or both of first application 208 and second application 214 may also be located outside of storage device 218, as either application need only be in operative communications with first computer 210.

Application program interface 216 is any type of computer-executable instructions adapted to check and compare two or more copies of an electronic file for synchronization purposes, and may be stand alone software that is specifically designed for synchronizing two or more copies of an electronic document, a software utility that operates as a component of another application, an integrated component of first or second application 208, 214 and/or the like. Application program interface 216 may also perform additional tasks that may or may not be related to synchronization. First version 212, first application 208, second application 214 and application program interface 216 may reside in the same storage device 218, or within or across any number different storage devices 218.

Second computer 222 comprises a second processor 224 and storage device 228 which contains a second version 226 of the electronic file discussed above in connection with first version 212. As discussed above, storage device 228 may be located anywhere that is in operative communications with second computer 222, to include a remote location or the like. Also, storage device 228 and storage device 218 may, in an embodiment, be the same storage device. Operatively connecting first and second computers 210, 222 is network 218. Network 218 may be any communications network adapted for such operative communications, such as for example a LAN, WAN, wireless network or the like. As may be appreciated, any number of first computers 210 and second computers 222 may be operatively connected to network 218.

Figure 3:
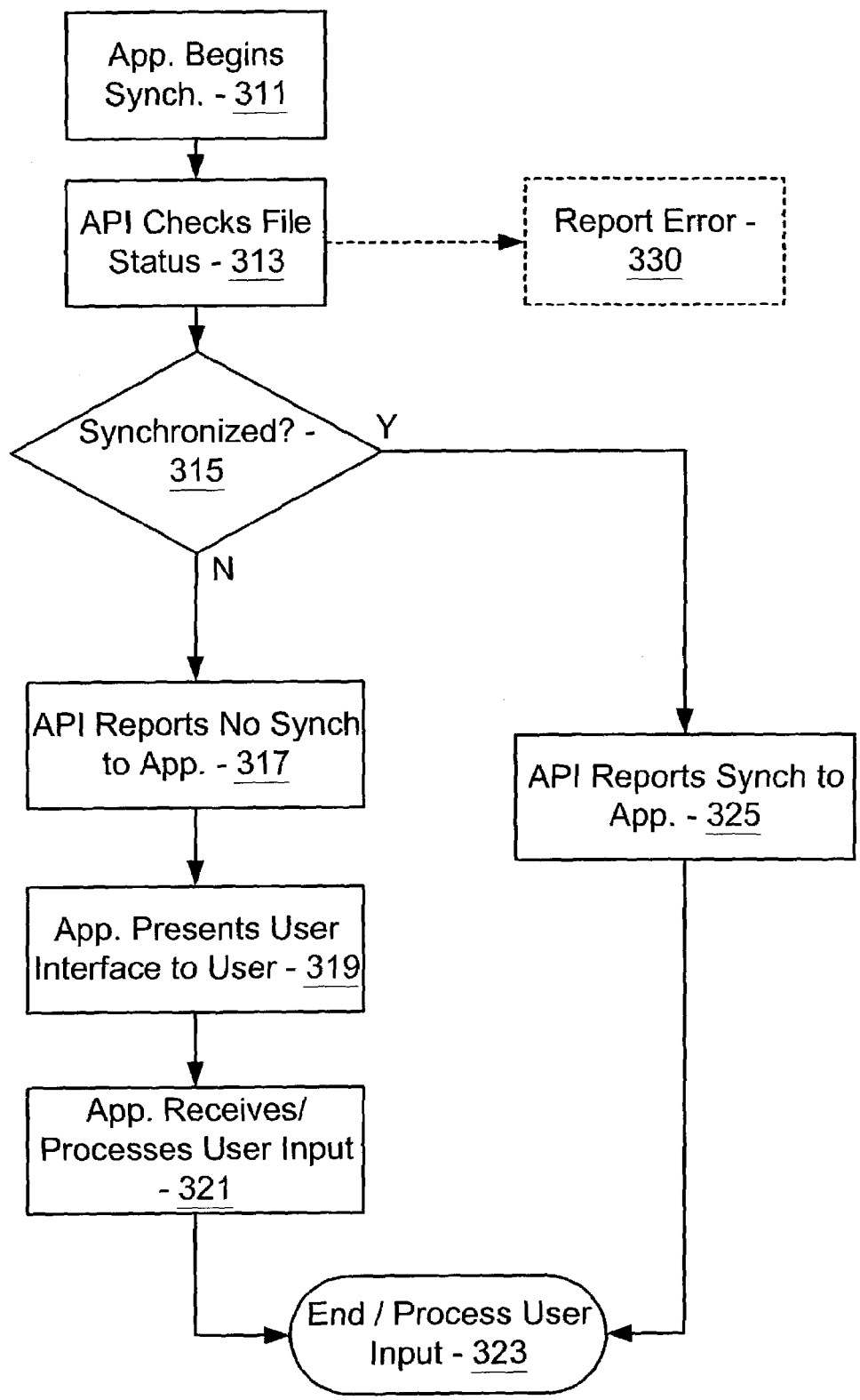
FIG. 3 is a flowchart showing a synchronization process in accordance with one embodiment of the present invention.

Turning now to FIG. 3, at step 311 a synchronization process begins. In one embodiment, first application 208 initiates the synchronization process, and second application 214 carries out the synchronization process. In another embodiment, first application 208 and second application 214 are a single application, in which case the single application both initiates and carries out the synchronization. While the discussion of FIG. 3 that follows describes a process involving both first application 208 and second application 214, it may be appreciated that a single application may alone perform all of the steps performed by first application 208 and second application 214.

Any number of situations may cause first application 208 to initiate a synchronization process, such as for example: opening, closing, saving or the like of first version 212; upon recognizing a first and second version of the electronic file; manually initiating upon a user request; initiating at timed intervals; upon a user logging into a system and/or the like. In addition, first application 208 may impose any additional conditions or may use substitute conditions such as, for example, only initiating a synchronization when a certain number of versions are present. More details with respect to initiating a synchronization event in one embodiment follows below in connection with FIG. 4. To initiate the process, first application 208 causes application program interface 216 to access first version 212 and second version 226. Accessing first version 212 and second version 226 may be performed by any computing means, such as by viewing information associated with each version, finding each version by using searching functionality, locating each version by using identifying information provided by first application 208 or the like.

First application 208 may provide interface 216 with any amount of identifying information about second version 226, such as for example a file name, location, address and/or the like. Interface 216 may be adapted to actively locate second version 226, or may have limited functionality that permits only looking at a location specified by first application 208, first version 212 or the like. Also, interface 216 may be configured to perform any number of additional tasks that may even be unrelated to the synchronization process. At step 313, application program interface 216 locates second version 226 and checks for a synchronization status. The application program interface 216 determines the status by comparing information, such as for example time and/or date of a last update or the like, for first version 212 against second version 226. Synchronization status may also be determined by any criteria additional to or substituted for the information mentioned above. If the information matches information and/or criteria specified by first application 208, first and second versions 212, 226 have a synchronized status. If the information is inconsistent, first and second versions 212, 226 do not have a synchronized status, as such an inconsistency indicates the possibility that changes may have been made to one of such versions 212, 226. Alternatively, if application program interface 216 detects an error, a condition not provided for, a condition that first application 208 has specified as cause for terminating the synchronization, or the like, then interface 216 proceeds to step 330. At step 330, interface 216 informs first application 208 of the condition and first application 208 proceeds accordingly, which may include any type of action or inaction.

At step 315, application program interface 216 may take one of two courses of action depending on the outcome of the synchronization determination of step 313. If application program interface 216 has determined that first version 212 and second version 226 are synchronized, interface 216 proceeds to step 325. At step 325, application program interface reports to first application 208 that first version 212 and second version 226 are synchronized. Such a report indicates to first application 208 that no further synchronization activities are presently necessary, as first version 212 comprises the most recent version of the electronic file. The report may also indicate that a user may use first application 208 or second application 214 to alter first version 212.

At step 323, the synchronization process ends. At this step, first application 208 may cease functioning, such as for example if such synchronization process took place when first application 208 was closing first version 212 of the electronic document. In such a situation, once synchronization has occurred, therefore, first application 208 has no more functions to perform and may terminate manually by user or automatically. In another embodiment, first application 208 initiates the synchronization process when opening a first version 212. In such a situation, application would not terminate at the completion of such synchronization event, and rather would permit user to begin altering first version 212 using first application 208 functionality, if available.

If, at step 315, however, application program interface 216 has determined that first version 212 and second version 226 are not synchronized, interface 216 proceeds to step 317. At step 317, application program interface 216 reports to first application 208 and/or second application 214 that first version 212 and second version 226 are not synchronized. Such a report causes second application 214 to begin synchronizing first version 212 and second version 226 with user input as discussed below in connection with steps 319 and 321.

At step 319, second application 214 presents a user interface to a user by displaying the user interface on a display device 230. Such user interface may be in the form of a text and/or graphics window, audio prompt and/or the like, and any such configuration of a user interface is equally consistent with an embodiment of the present invention. In presenting such user interface, second application 214 may present one or more options to a user using second application 214 functionality or the like. For example, if second application 214 is a word processor, second application 214 may present a synchronization option to a user within a word processing user environment of second application 214, such as for example an editing window with a page view of such first version 212 and/or the like. Also, second application 214 may highlight differences between first version 212 and second version 226 using color, sounds, graphics and the like to better enable user to make synchronization decisions. Second application 214 may also provide additional information, such as for example the identity of each user who altered either version 212, 226, and may only permit a user to alter a version 212, 226 if such user has permission, in the form of a security clearance or the like, to do so. Second application 214 may enable user to, for example, merge versions 212, 226 into a third copy, so as to incorporate changes in both versions 212, 226. An additional option may also be in the form of guidance derived from second application 214 functionality such as for example a recommended course of action and/or the like. As may be appreciated, an option may be anything that may be generated by second application 214 using second application 214 functionality with respect to first version 212 and second version 226.

At step 321, second application 214 receives and processes user input. Such user input may comprise any amount of information regarding such synchronization. For example, user input may select a particular alteration of either first version 212 or second version 226 of the electronic file that the user wishes to retain. In another embodiment, user input may comprise a selection of either first version 212 or second version 226 that user wishes to retain in its entirety. In still another embodiment, user input may comprise edits of first and/or second version 212, 226 using the functionality of second application 214 that, when completed, results in synchronizing first version 212 and second version 226. As may be appreciated, user input may comprise any input made available by second application 214 for selection or use by a user, and any such input is consistent with an embodiment of the present invention.

As also may be appreciated, steps 319 and 321 may repeat, as such user interface may be redisplayed and/or refreshed depending on user input. For example, user interface may be reconfigured by second application 214 based on user input. Such a reconfiguration may occur if, for example, user selects one of a plurality of differences between first version 212 and second version 226 and second application 214 redisplays user interface to user to reflect such a selection. Steps 319 and 321 may repeat any number of times, or not at all, and either such situation is equally consistent with an embodiment of the present invention. Also, second application 214 may report any results of the synchronization to first application 208 or to interface 216. The results reported by second application 214 may be any information associated with the synchronization, such as the option selection(s), synchronization result(s) or the like.

Second application 214 may proceed to step 323, the end of the synchronization, when a triggering event occurs. Such triggering event may occur at any time, such as for example when user has completed reconciling all differences between first version 212 and second version 226, when user directs second application 214 to abort or terminate the synchronization process without completing synchronization, at a predefined time, or the like. At step 323, the synchronization ends. First application 208 or second application 214 may then, as mentioned above in connection with step 325, take any action at step 323 that is consistent with the context in which the synchronization took place.

Figure 4:
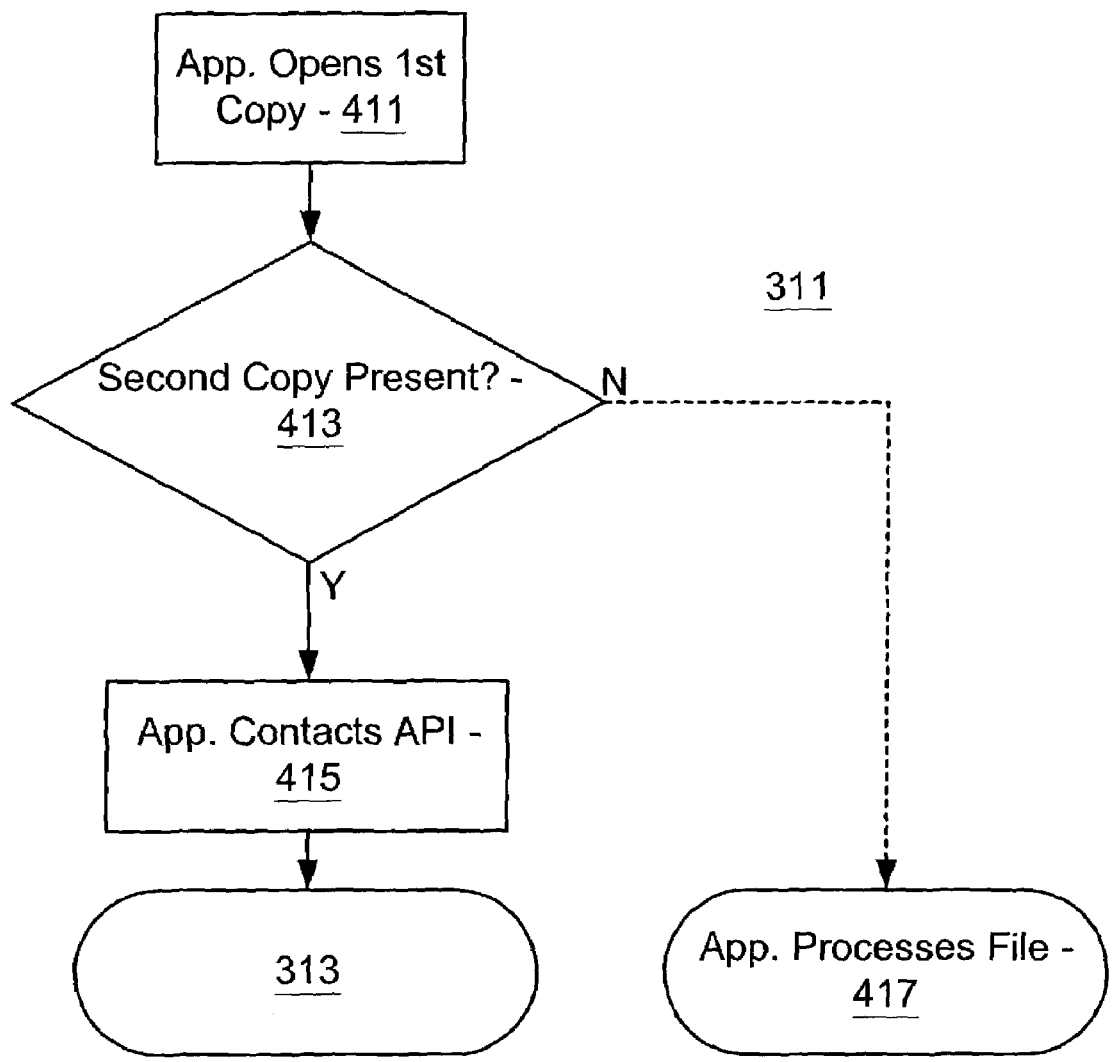
FIG. 4 is a flowchart illustrating a method of initiating a synchronization process in accordance with one embodiment of the present invention.

Turning now to FIG. 4, a detailed view of step 311 is shown in accordance with one embodiment of the present invention. As discussed above in connection with FIG. 3, in step 311 first application 208 initiates a synchronization process. FIG. 4 illustrates with greater particularity one embodiment of such an initiation step, where first application 208 initiates such synchronization process upon opening first version 212 of an electronic file. As discussed above, first application 208 may initiate such synchronization process at any time, such as for example when opening, saving or closing such first version 212, at set or variable intervals, upon user inputs and/or the like.

At step 411, first application 208 opens first version 212 of an electronic file. Such opening will most commonly occur upon user input to open such first version 212, but any means for initiating such opening of first version 212 is consistent with an embodiment of the present invention. At step 413, first application 208 determines whether first version 212 has an associated second version 226. first application 208 may proceed to step 413 upon completely opening first version 212 in step 411, or may proceed to step 413 at any point during such opening process including, for example, before opening first version 212 at step 411. Also, any method may be employed to enable first application 208 to make such a determination. For example, information such as an electronic stamp or the like may be associated with such first version 212 thereby enabling first application 208 to make such determination. In contrast, first application 208 may search any or all computing devices operatively connected to network 218, such as for example second computer 222, for such determination. As may be appreciated, first application 208 may use any method of determining the existence of second version 226 while remaining consistent with an embodiment of the present invention.

If, at step 413, first application 208 does not find second version 226 first application 208 determines that first version 212 is the only copy of such electronic file and proceeds to step 417. At step 417 first application 208 processes first version 212 normally. Such normal processing may be any type of processing that first application 208 typically performs on electronic files of the same format as first version 212, possibly in accordance with any user inputs. For example, in FIG. 4 first application 208 was in the process of opening first version 212 when first application 208 initiated such synchronization process according to step 311. Upon finding no need for a synchronization—because of the absence of second version 226—first application 208 completes opening of first version 212 and proceeds accordingly.

If, at step 413, first application 208 finds second version 226 first application 208 proceeds to step 415. At step 415, first application 208 contacts application program interface 216 to commence synchronization of first version 212 and second version 226. Upon contacting application program interface 216, such synchronization process proceeds to step 313 as discussed above in connection with FIG. 3.

Thus, methods and apparatus for managing file replication in applications have been presented. While the present invention has been described in connection with the preferred embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed:

1. A computer-implemented method executing on a computer system comprising a processor and a memory, the method for managing a first and second version of an electronic file, the method comprising:
    initiating, using a first software application executing on the processor, a synchronization event to synchronize the first version with the second version; causing, by the first software application, an application program interface of the computer system to access said first and second versions;
    comparing, by the application program interface, information associated with each of said first and second versions and generating a result;
    reporting, by the application program interface, the result of the comparison to the first software application;
    causing, by the application program interface, and in response to the result, a second software application executing on the processor to generate a user interface in accordance with a feature of the second software application, the generated user interface being presented to a user within the second software application, the electronic file being associated with the second software application;
    opening the first and second versions of the electronic file, by the second software application and presenting such opened first and second versions to the user;
    presenting, by the second software application, a synchronization option to the user with regard to the presented versions using the generated user interface of the second software application, the synchronization option being provided by the second software application;
    receiving, by the second software application, user input from the user by way of the user interface;
    automatically synchronizing, by the second software application, the first and second versions according to the user input received by way of the user interface; and
    automatically synchronizing the first and second versions comprises merging the first and second versions into a third version according to input received from the user interface while remaining in the user interface of the second software application and overwriting the first and second versions with the third version.

2. The method of claim 1, wherein the first and second software applications are the same application.

3. The method of claim 1, wherein the result of said comparing step is a synchronization status of the first and second versions.

4. The method of claim 1, wherein the first version is stored on a first computer, and the second version is stored on a second computer, and said first and second computers are operatively connected by a communications network.

5. The method of claim 1, wherein the third version of the electronic file comprises a portion of the first version of the electronic file and a portion of the second version of the electronic file.

6. The method of claim 1, wherein said step of presenting a synchronization option further comprises displaying the first and second versions in the user interface.

7. The method of claim 1, wherein the step of initiating the synchronization event occurs upon the first software application detecting information associated with the first version of the electronic file indicative of the second version of the electronic file.

8. The method of claim 1, wherein the step of initiating the synchronization event occurs upon the first software application opening the first version of the electronic file.

9. The method of claim 1, wherein the step of initiating the synchronization event occurs upon the first software application saving the first version of the electronic file to a storage device of the computer system.

10. The method of claim 1, wherein the step of initiating the synchronization event occurs upon the first software application recognizing the first version and second version.

11. A computer-readable storage medium having computer-executable instructions for performing a method for managing a first and second version of an electronic file, the method comprising:
    initiating, using a first software application, a synchronization event to synchronize the first version on a first computer with the second version;
    causing, by the first software application, an application program interface to access said first and second versions;
    comparing, by the application program interface, information associated with each of said first and second versions and generating a result;
    reporting, by the application program interface, the result of the comparison to the first software application;
    causing, by the application program interface, and in response to the result, a second software application to generate a user interface in accordance with a feature of the second software application, the generated user interface being presented to a user within the second software application, the electronic file being associated with the second software application;
    opening the first and second versions of the electronic file, by the second software application and presenting such opened first and second versions to the user;
    presenting, by the second software application, a synchronization option to the user with regard to the presented versions using the generated user interface of the second software application, the synchronization option being provided by the second software application;
    receiving, by the second software application, user input from the user by way of the user interface;
    automatically synchronizing, by the second software application, the first and second versions according to the user input received by way of the user interface; and
    automatically synchronizing the first and second versions comprises merging the first and second versions into a third version according to input received from the user interface while remaining in the user interface of the second software application and overwriting the first and second versions with the third version.

12. The computer-readable storage medium of claim 11, wherein the first and second software applications are the same application.

13. The computer-readable storage medium of claim 11, wherein the result of said comparing step is a synchronization status of the first and second versions.

14. The computer-readable storage medium of claim 11, wherein the first version is stored on a first computer, and the second version is stored on a second computer, and said first and second computers are operatively connected by a communications network.

15. The computer-readable storage medium of claim 11, wherein, said third version comprises a portion of the second version of the electronic file.

16. The computer-readable storage medium of claim 11, wherein said step of presenting a synchronization option farther comprises displaying the first and second versions in the user interface.

17. The computer-readable storage medium of claim 11, wherein the step of initiating the synchronization event occurs upon the first software application detecting information associated with the first version of the electronic file indicative of the second version of the electronic file.

18. The computer-readable storage medium of claim 11, wherein the step of initiating the synchronization event occurs upon the first software application opening the first version of the electronic file.

19. The computer-readable storage medium of claim 11, wherein the step of initiating the synchronization event occurs upon the first software application saving the first version of the electronic file to a storage device of the first computer.

20. The computer-readable storage medium of claim 11, wherein the step of initiating the synchronization event occurs upon the first software application recognizing the first version and second version.

21. A computer-implemented method executing on a computer system comprising a processor and a memory, the method for managing a first and second version of an electronic file, the method comprising:

initiating, using a first software application executing on the processor, a synchronization event to synchronize the first version on the first computer with the second version upon the recognition of the first version of the electronic file, the second version of the electronic file, or the first version and the second version of the electronic file;

causing, by the first software application, an application program interface of the computer system to access said first and second versions;

comparing, by the application program interface, information associated with each of said first and second versions and generating a result;

the result being a synchronization status of the first and second versions;

reporting, by the application program interface, the result of the comparison to the first software application;

displaying the first and second versions in a user interface;

causing, by the application program interface, and in response to the result, a second software application executing on the processor to generate a user interface in accordance with a feature of the second software application, the generated user interface being presented to a user within the second software application, the electronic file being associated with the second software application;

opening the first and second versions of the electronic file, by the second software application and presenting such opened first and second versions to the user;

presenting, by the second software application, a synchronization option to the user with regard to the presented versions using the generated user interface of the second software application, the synchronization option being provided by the second software application;

receiving, by the second software application, user input from the user by way of the user interface;

automatically synchronizing, by the second software application, the first and second versions according to the user input received by way of the user interface; and automatically synchronizing the first and second versions comprises merging the first and second versions into a third version according to input received from the user interface while remaining in the user interface of the second software application and overwriting the first and second versions with the third version.

* * * * *